3,019,248
PROCESS FOR MAKING PHOSPHORUS-CONTAIN-
ING ORGANOSILICON COMPOUNDS
Frank Fekete, Verona, Pa., assignor to Union Carbide
Corporation, a corporation of New York
No Drawing. Filed Dec. 23, 1958, Ser. No. 782,377
7 Claims. (Cl. 260—448.8)

This invention relates to a novel process for preparing organosilicon compounds containing combined silicon and phosphorus.

My novel process in its broadest sense involves the reaction of a phosphorus compound containing at least one hydrogen atom or alkali metal atom, e.g., sodium, potassium, lithium and cesium, bonded to phosphorus with a silicon compound containing at least one halogen-substituted hydrocarbon group attached to silicon and the removal of the formed hydrogen or metal halide from the reaction to produce a phosphorus-silicon product. The reaction is represented by the general equations:

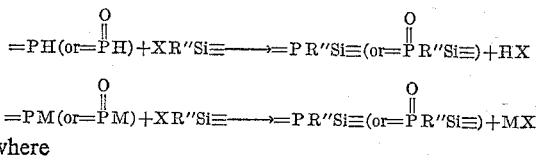

where

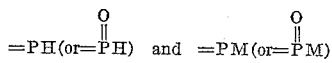

are the phosphorus compound, $XR''Si\equiv$ is the silicon compound wherein X is halogen, M is alkali metal and R'' wherever employed herein is a divalent hydrocarbon group.

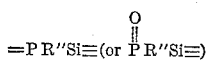

is the phosphorus-silicon product, MX is alkali metal halide and HX is hydrogen halide.

The phosphorus compounds employed as starting materials in my process are those containing one trivalent or quinquevalent phosphorus atom to which is bonded at least one hydrogen, or alkali metal atom and the remaining unfilled valences of which are satisfied by not more than one oxo group and/or by no other members than hydrogen, hydrocarbyl and hydrocarbyloxy groups. By the term "hydrocarbyl," as employed herein, is meant a monovalent hydrocarbon group, i.e., a group composed of carbon and hydrogen. Thus, halohydrocarbyl designates a monovalent halogen-substituted hydrocarbon group and hydrocarbyloxy designates a monovalent hydrocarbon group attached to either oxygen, i.e., R'O— where R' is monovalent hydrocarbon.

The silicon compounds employed as starting materials herein are the organosilanes and the organopolysiloxanes and contain at least one silicon atom and at least one halohydrocarbyl group bonded to silicon. Each remaining unfilled valence of all silicon atoms is satisfied by no other group than hydroxy, alkoxy and hydrocarbyl groups and by no other atoms than carbon of a hydrocarbyl group and oxygen which is also bonded to no other atoms than hydrogen, silicon and carbon of an alkyl group.

My process is carried out by bringing the silicon compound and the phosphorus compound into reactive contact and continuously removing from the reaction zone the hydrogen or metal halide as it is formed in the reaction. Mole ratios of phosphorus compound and silicon compound employed in the process are not narrowly critical. Stoichiometric amounts are preferred for efficient reaction and ease of product recovery. For example, one mole of phosphorus-bonded hydrogen is preferred for each mole of chlorine, bonded through hydrocarbon to silicon, desired to be displaced. Other than stoichiometric amounts of starting materials can also be used.

The temperature of the reaction is not narrowly critical and can be varied in accordance with the speed of reaction desired. Temperatures of 75° C. to 300° C. are advantageous in providing a smooth reaction and high yields of products. Temperatures below 75° C. can be employed if desired but the reaction rate is slowed. Temperatures above 300° C. can also be employed but the likelihood of reduced yields is greater. My process is advantageously carried out at atmospheric pressure or at whatever pressures exist in the particular reaction vessel employed without purposely applying increased or reduced pressures. Sub-atmospheric or super-atmospheric pressures can be employed, however, if desired. Where the starting materials are gaseous at the chosen reaction temperature super-atmospheric pressures and a closed reaction vessel are conveniently employed to bring the starting materials into reactive contact. No catalysts are required although suitable catalysts such as tetramethyl ammonium chloride, trimethyl benzyl ammonium chloride and the like can be employed for whatever advantage they may provide.

Solvents are not required but are useful in simplifying the handling of the reaction mixture. If a solvent is employed, xylene, toluene, benzene, methylethyl ketone, dimethylformamide and the like are recommended. A solvent which dissolves the starting materials and the products but does not dissolve formed hydrogen or metal halides is particularly useful in removing the hydrogen or metal halides from the reaction zone. Such solvents include toluene, benzene, xylene and dimethylformamide and the like. The formed hydrogen or metal halide is continuously removed from the reaction zone by any suitable technique of which many are known. The formed metal halides are most effectively removed by precipitation which can be assured by employing a solvent, as listed above, which dissolves the silicon compound and phosphorus compound starting materials and the phosphorus-silicon product but does not dissolve the formed metal halide. A particularly suitable technique for removing formed hydrogen halide is to employ a hydrogen halide acceptor, such as the tertiary amines, added to the reaction mixture in the approximate stoichiometric amounts based on the amount of hydrogen halide expected to be formed in the reaction. Tertiary amines, e.g., triethyl amine, pyridine, tributyl amine, and the like are some of the excellent hydrogen halide acceptors. Excess amounts of the acceptor over and above the stoichiometric amount is preferably employed to ensure the substantially complete removal of the hydrogen halide. Primary amines, secondary amines and ammonia can also be employed in controlled amounts as hydrogen halide acceptors. For example the primary and secondary amines and ammonia can be continuously or intermittently added as the reaction proceeds (e.g., by titration) in such quantities that maintain the reaction mixture slightly acidic to slightly basic. The hydrogen halide can even be continuously stripped by boiling it from the reaction mixture as it is formed employing techniques within the chemist's skill. Although it is not necessary in order to obtain a product, it is preferable no matter what particular technique is employed in removing hydrogen halide to maintain the pH of the system above about 6 to prevent decreased yields due to possible side reactions involving the formed hydrogen halide, and below about 8 when strongly basic acceptors or other materials are employed to prevent possible side reactions involving the silicon compound in the event moisture is also present.

The product is isolated by any suitable procedure many of which are commonly employed by persons skilled in the art. For example, the distillable products, i.e., in general the silanes, are most readily isolated and purified by fractional distillation. The high boiling products, i.e., in general the siloxanes, are most readily isolated by removing foreign material, e.g., unreacted starting materials and by-products; by distillation, washing with solvents or filtering or any combination of these procedures. Other isolation procedures commonly employed by skilled chemists, e.g., recrystallization procedures for solid crystalline products, can also be used for isolating the products disclosed herein.

Phosphorus compounds which are employed as starting materials in my process include trivalent phosphorus compounds which contain one trivalent phosphorus atom and at least one hydrogen or alkali metal atom attached to phosphorus, each remaining valence of phosphorus being satisfied by a hydrogen atom, a hydrocarbyl group or a hydrocarbyloxy group. Also employed as starting materials are quinquevalent phosphorus compounds which contain one quinquevalent phosphorus atom, one oxo oxygen connected to phosphorus and at least one hydrogen or alkali metal atom attached to phosphorus, each remaining valence of phosphorus being satisfied by a hydrogen atom, a hydrocarbyl group or a hydrocarbyloxy group.

The phosphorus compounds employed as starting materials are those described above and include phosphines, phosphine oxides, phosphinites, phosphinates, phosphonites, phosphonates, metal and di-metal phosphines, metal and di-metal phosphine oxides, metal and di-metal phosphinites, metal and di-metal phosphinates, metal phosphinates and metal phosphonates (wherein the term metal designates alkali metal). The phosphines are illustrated by methylethylphosphine, dipropylphosphine, diphenylphosphine, di(cyclohexyl)phosphine, iso-amylphosphine, benzyl-phosphine, 2,4,5-trimethylphenylphosphine, $(CH_3)_2PH$, $(CH_3)(C_2H_5)PH$, $(C_2H_5)_2PH$,
$(CH_3)(iso\text{-}propyl)PH$, $(iso\text{-}propyl)_2PH$,
$(C_2H_5)(C_4H_9)PH$, $(C_4H_9)_2PH$,
$(iso\text{-}propyl)(iso\text{-}butyl)PH$, $(iso\text{-}amyl)_2PH$,
$(iso\text{-}butyl)_2PH$, $(CH_3)(C_6H_5)PH$, $(C_2H_5)(C_6H_5)PH$,
$(benzyl)_2PH$, $(C_6H_5)_2PH$, $(2\text{-}CH_3 \cdot C_6H_4)_2PH$,
$(C_6H_5)(4\text{-}CH_3 \cdot C_6H_4)PH$, $(naphthyl)_2PH$ and the like, and are represented by the formulas $R'PH_2$ and $R'_2PH$. Wherever employed herein, R' is a hydrocarbyl group. Phosphine oxides are illustrated by

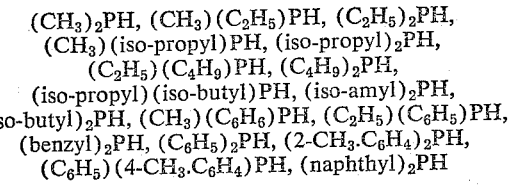

and the like, and are represented by the formulas $R'P(O)H_2$ and $R'_2(P(O)H$. Phosphinites are represented by the formulas $(R'O)PH_2$ and $(R'O)R'PH$ and are illustrated by $(C_2H_5O)PH_2$, $(C_6H_5O)(C_2H_5)PH$, $(C_6H_5)(C_8H_{17}O)PH$, $(C_4H_9O)(C_6H_5)PH$. Phosphinates are represented by the formulas $(R'O)P(O)H_2$ and $(R'O)R'P(O)H$ and are illustrated by $(C_6H_5O)P(O)H_2$, $(xylyloxy)P(O)H_2$,
$(C_6H_5)(C_8H_{17}O)P(O)H$, $(C_2H_5O)(C_6H_5)P(O)H$, $(C_4H_9O)(C_6H_5)P(O)H$. Phosphonites are represented by the formula $(R'O)_2PH$ and are illustrated by $(C_6H_5O)_2PH$ Phosphonates are represented by the formula $(R'O)_2P(O)H$ and are illustrated by diphenyl phosphonate, $(C_6H_5O)_2P(O)H$, $(xylyloxy)_2P(O)H$ The nomenclature employed herein to designate phosphorus compounds is in accordance with the rules for naming compounds containing one phosphorus atom as approved by the general nomenclature committee of the Organic Division of the American Chemical Society and as published in Chemical and Engineering News, volume 30, Number 43, pages 4515 through 4522 (October 27, 1952). The use of "(O)" in the formulas herein designates oxygen which is bonded to only phosphorus, e.g. P=O, and no differentiation is being made herein between →O (or semipolar linkage) and =O (or double bond linkage). In many instances, the phosphonates exist in the tautomeric form as the diesters of phosphorus acid, e.g., $(R'O)_2POH$. In these instances, such diesters are equivalent to the phosphonates and can be used in place of said phosphonates in my process.

Certain of the phosphorus compounds described, and illustrated above, used as starting materials are readily oxidizable by gaseous oxygen, and the exclusion of oxygen while carrying out my process when employing these readily oxidizable phosphorus compounds is required. Readily oxidizable phosphorus compounds are the phosphines and especially those phosphines having lower alkyl groups directly bonded to phosphorus. Those phosphines having one or more aromatic group directly bonded to phosphorus are much more resistant to oxidation by gaseous oxygen and precautions against their oxidation need not be as stringently followed. The exclusion of oxygen is conveniently accomplished by carrying out the process in a reaction vessel which has been purged by nitrogen or argon, or by the use of a blanket of nitrogen or argon. Other methods for providing an inert atmosphere by the exclusion of oxygen are known to skilled chemists and can be employed instead of the techniques outlined above. Products obtained from the readily oxidizable phosphines are more resistant to oxidation than the phosphine starting materials. These products are also useful in the production of the corresponding phosphine oxide by oxidation with air or oxygen. Thus, gamma - (phenylethylphosphino) propyltriethoxysilane, $C_6H_5(C_2H_5)P(CH_2)_3Si(OC_2H_5)_3$, is oxidized by gaseous oxygen under pressure at 25 to 60° C. to gamma-(phenylethylphosphinyl)propyltriethoxysilane $C_6H_5(C_2H_5)P(O)(CH_2)_3Si(OC_2H_5)_3$ The metal phosphines are represented by the formula $R'_2PM$ and the di-metal phosphines by $R'PM_2$. Whereever employed herein, M designates an alkali metal atom and R designates a hydrogen atom or a hydrocarbyl group, and need not be the same throughout the same molecule. Illustrative of the metal and di-metal phosphines are $(C_6H_5)_2PNa$, $(C_6H_5)_2PK$, $(C_6H_5)PNa_2$, $(C_6H_5)PK_2$, $(C_6H_5)(C_2H_5)PNa$, $(C_6H_5)(C_2H_5)PK$, $(C_6H_5)_2PLi$, $(C_6H_5)(C_2H_5)PLi$ and the like. The metal phosphine oxides and di-metal phosphine oxides are represented respectively by the formulas $R'_2P(O)M$ and $R'P(O)M_2$. Illustrative metal and di-metal phosphine oxides are $(C_6H_5)(C_2H_5)P(O)Na$, $(C_6H_5)(C_2H_5)P(O)K$, $(C_6H_5)(C_2H_5)P(O)Li$ $(C_6H_5)P(O)Na_2$, $(C_6H_5)P(O)K_2$, $(C_6H_5)P(O)Li_2$ and the like. The metal phosphinites and di-metal phosphinites are represented by the respective formulas $(R'O)RPM$ and $(R'O)PM_2$. Illustrations of metal and di-metal phosphinites are $(C_6H_5O)(C_6H_5)PK$, $(C_6H_5)(C_2H_5O)PNa$, $(C_6H_5O)PK_2$, $(xylyloxy)PK$ $(C_6H_5)(C_8H_{17}O)PK_2$ and the like. The metal phosphinates and di-metal phosphinates are represented by the respective formulas $(R'O)RP(O)M$ and $(R'O)P(O)M_2$ Metal and di-metal phosphinates are illustrated by $(C_6H_5)(C_8H_{17}O)P(O)Na$, $(C_6H_5)(C_8H_{17}O)P(O)K$ $(C_6H_5)(C_2H_5O)P(O)Na$, $(C_6H_5)P(O)Na_2$ $(C_6H_5O)P(O)K_2$ and the like. The metal phosphonates are represented by the formula $(R'O)_2P(O)M$ and are illustrated by $(C_6H_5O)_2P(O)Na$, $(C_6H_5O)_2P(O)K$, $(C_2H_5O)_2P(O)Na$, $(C_2H_5O)_2P(O)K$, $(C_4H_9O)_2P(O)Na$, $(C_4H_9O)_2P(O)K$ and the like. The metal phosphonites are represented by the formula $(R'O)_2PM$ and are illustrated by $(C_6H_5O)_2PNa$, $(C_6H_5O)_2PK$, (xylyloxy)$_2$PNa and the like. The metal and di-metal phosphines, phosphine oxides, phosphinates and phosphinites and the metal phosphonates and phosphonites are easily prepared by heating an alkali metal with a phosphorus compound having hydrogen bonded to phosphorus such as are described and illustrated above. Preferred phosphorus compounds are those described above wherein the hydrocarbyl group, R', and the hydrocarbyloxy group, R'O, attached to phosphorus contain from 1 to 18 carbon atoms.

The silicon compounds which are employed in my process include, for example, the halohydrocarbylsilanes of the formula:

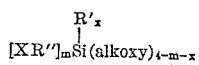

wherein X, R' and R'' are as previously defined. R' and R'' need not be the same throughout the same molecule. The symbol m is an integer from 1 to 2 and x is an integer from 0 to 3. The silicon compounds which are employed as starting materials in the practice of this invention also include organopolysiloxanes containing the siloxane unit:

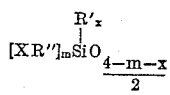

either recurring by itself or intercondensed with siloxane units of the formula:

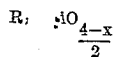

where X, R', R'', x and m are as previously defined and need not be the same throughout the same molecule. Particularly preferred silicon compounds as starting materials are those organosilanes and organopolysiloxanes described above wherein the divalent hydrocarbon group, R'', contains from 1 to 18 carbon atoms and the hydrocarbyl groups, R', if any, attached to silicon contain from 1 to 18 carbon atoms.

Illustrative of silicon compounds employed as starting materials in my process are gamma-chloropropyltriethoxysilane, chloromethyl(methyl)diethoxysilane, omega-chlorostearyl(diphenyl)butoxysilane, 4 - chlorocyclohexyltripropoxysilane, 3 - chlorocyclopentyl(phenyl)-(methyl)ethoxysilane, p - chlorophenyltributoxysilane, o - chlorophenylethyl(ethyl)diethoxysilane, chloromethylpentamethyldisiloxane, chloroethylpentaethyldisiloxane, bromomethylheptamethyltetrasiloxane and higher alkyl and aryl polysiloxane oils containing at least one halohydrocarbyl group attached to silicon.

The products produced by my process contain at least one phosphorus atom, at least one silicon atom, and at least one divalent hydrocarbon group interconnecting each phosphorus atom to silicon. Remaining unfilled valences of phosphorus are satisfied by no other groups than one oxo group, hydrogen atoms, hydrocarbyl groups and hydrocarbyloxy groups. Each remaining unfilled valence of all silicon atoms is satisfied by no other group than hydroxy, alkoxy and hydrocarbyl and by no other atoms than carbon of a hydrocarbyl group and oxygen which is also bonded to no other atoms than hydrogen, silicon and carbon of an alkyl group.

Heretofore known compounds which can be prepared by my process are those of the following formulas:

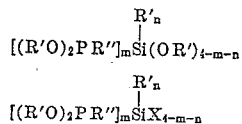

wherein R', R'', X and m are as previously defined. The symbol n represents an integer of 0 to 2. Other known siloxanes and silanes which can be prepared by my process are those having at least one radical selected from the group consisting of:

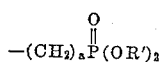

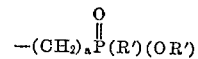

and

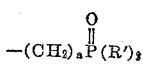

wherein a is an integer of from 1 to 18, attached to silicon and all other valences of silicon being satisfied by monovalent hydrocarbon groups or siloxane linkages.

My novel compounds which are prepared by the process of this invention are the silanes having the following formulas wherein R' and R'' are as previously defined and R' need not be the same throughout the same molecule, R''' is a member of the class consisting of hydrocarbyl and hydrocarbyloxy, n is an integer of 0 to 2, m and p are each integers of 1 or 2, and the sum (n+m) is an integer of 1 to 3:

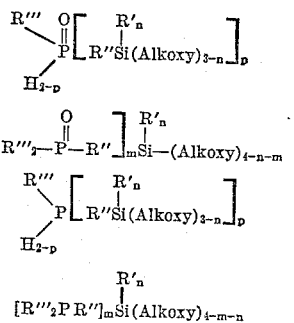

Novel polysiloxanes containing siloxane units of the following formulas wherein R'' is as previously defined, R' and R''' are as previously defined and need not be the same throughout the same molecule, n, m, (n+m) and p are as defined above and are the same throughout the same siloxane unit but need not be the same throughout the same polysiloxane molecule, are also prepared by my process:

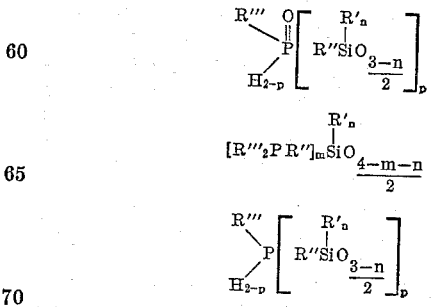

These novel polysiloxanes include polysiloxanes also containing siloxane units of the formula:

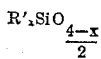

(R' being as previously defined and need not be the same throughout the same molecule, x being an integer from 0 to 3 and need not be the same throughout the same polysiloxane molecule) as well as the novel siloxane units of the formulas shown above. These polysiloxanes are also prepared by the hydrolysis and condensation of the novel silanes described above and by the cohydrolysis and cocondensation of these novel silanes with hydrolyzable silanes having only hydrocarbyl groups and/or hydrolyzable groups, such as halogen, acyloxy and alkoxy, bonded to silicon. Hydrolysis and condensation techniques known to those skilled in the art of silicon chemistry are employed. Equilibration techniques commonly employed in the art of silicon chemistry are also used to make my novel polysiloxanes.

The polysiloxanes made by the process of this invention and those made by the hydrolysis and condensation of the phosphorus-containing silanes made by the process of this invention are useful in the form of resins for providing protective coatings to metals such as iron, steel, aluminum and the like. My polysiloxanes are also useful in the form of linears and oils as lubricants and as additives to known lubricants for improving lubricity.

The following examples are presented. In these examples, all refluxing was conducted at atmospheric pressure unless otherwise specified.

Example 1

To a 500 ml. round-bottomed three-necked flask equipped with motor stirrer, addition funnel and reflux condenser was charged phenyl phosphine, $C_6H_5PH_2$, (43 g., 0.39 mole) and the system placed under a nitrogen atmosphere. The phosphine was chilled to $-40°$ C. and sodium (9.0 g., 0.39 mole) was added through the addition funnel in the form of a dispersion (40% sodium by weight in toluene) in a dropwise fashion over twenty minutes. The reaction mixture was allowed to warm to 0° C. and dimethyl "Cellosolve" (10 ml.) added. A vigorous reaction ensued. The reaction mixture was chilled once again to $-40°$ C. and stirred over one hour. The addition funnel was charged with ethyl bromide (42.5 g., 0.39 mole) which was added dropwise at $-40°$ C. over twenty minutes. Reaction was exothermic. A yellow-green phosphinide color was observed. This changed to a water-white phosphine color when mixture was allowed to warm up to 0° C. over one hour. Phenyl ethyl phosphine was thus prepared. Sodium dispersion (9.0 g. sodium, 40% by weight in toluene) and dimethyl "Cellosolve" (100 ml.) were charged to an addition funnel and the reaction mixture chilled to $-40°$ C. Addition of the contents of the funnel to the reaction mixture was completed in twenty minutes. Stirring was continued for one hour after addition was completed and then allowed to warm up to 25° C. Sodium phenyl ethyl phosphinide $(C_6H_5)(C_2H_5)PNa$ was thus obtained. The addition funnel was charged then with gamma-chloropropyltriethoxysilane (99 g., 0.41 mole) and the reaction mixture chilled to 0° C. Addition of the contents of the funnel was conducted in dropwise fashion over twenty minutes. The reaction mixture was stirred one hour after addition was complete and the mixture allowed to warm up to 25° C. It was then heated to 100° C. over 1.5 hr. to effect complete reaction. The mixture was allowed to return to room temperature (25° C.) and separated into a water-white liquid phase and a solid phase.

The water-white liquid phase was decanted through glass wool to separate it from the colloidal salts. The product was dried by distillation and 155 g. of crude material obtained. The crude product was subjected to further purification by distillation in vacuo through a twenty-five inch insulated Vigreaux column. A light yellow liquid (32.5 g.) boiling at 129 to 130° C. at 0.55 mm. of mercury pressure and having an index of refraction, $N_D^{25}$, of 1.4840 was obtained. Infra-red, elemental and molar refractive analyses of this product confirmed the formula $C_6H_5(C_2H_5)P(CH_2)_3Si(OC_2H_5)_3$, i.e., gamma-(phenylethylphosphino)propyltriethoxysilane.

Example 2

A total of 2 moles (276 g.) of diethyl phosphonate $[(C_2H_5O)_2P(O)H]$ was mixed with 400 cc. of anhydrous xylene in a three-necked flask fitted with condenser, stirrer, and dropping inlet. To this mixture was added 2 moles (46 g.) of metallic sodium (Na). The reaction occurred at room temperature and was cooled continuously. The temperature rose rapidly to 120° C. and by this time all of the Na was in solution and reacted. The mixture was further stirred and heated at this temperature for 1 hr. Sodium diethyl phosphonate was thus obtained. This mixture cooled to room temperature and 1 mole of $ClCH_2Si(CH_3)_2Cl$ added to the mixture by dropping funnel in a dropwise fashion with continuous stirring. The temperature was raised to 120° C. by heating while the chlorosilane was being added. Almost instantly with addition NaCl was precipitated out, giving a purple-colored solution. The reaction temperature was held at 130° C. and the mixture stirred for an additional 4 hours to insure complete reaction. The mixture was cooled and stirring was stopped. NaCl separated from the solution. Part of the product was removed by filtering and decanting and then the xylene was removed by distillation to give the desired product. The separated NaCl was weighed and found to be 115.0 g., almost theoretical for complete reaction. The product was a light yellow fluid. The yield of product was 90 to 98%. Analyses of the product confirmed the formula $(C_2H_5O)_2P(O)CH_2Si(CH_3)_2P(O)(OC_2H_5)_2$ i.e., (diethoxyphosphinylmethyl)(diethoxyphosphinyl)dimethylsilane.

Example 3

The metal salt of di(2-ethylhexyl)phosphonate $(C_8H_{17}O)_2P(O)H$ was formed by drying the phosphonate over anhydrous sodium sulfate and then mixing it with toluene and adding the desired amount of metallic sodium and heating the mixture to reflux temperature of toluene (atmospheric pressure) and holding it there until all the sodium had dissolved. The resultant product is the sodium salt of di(2-ethylhexyl)phosphonate $(C_8H_{17}O)_2P(O)Na$. Two moles of this salt were prepared by this procedure. To the two moles of the sodium salt of di(2-ethylhexyl)phosphonate (648 grams) was added 1 mole (143 grams) of chloromethyldimethylchlorosilane and the mixture refluxed at the boiling point of this composition. Immediately sodium chloride began to form and the refluxing was continued for a period of 6 hours after which time a very dark purple salt had formed and the reaction was complete. The product formed had the formula:

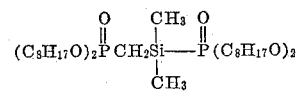

and a total of 674 grams of the above product is formed. A total of 115 grams of sodium chloride is obtained which indicates an almost quantitative yield of the desired product. Infra-red analytical and molar refraction data substantiate the structure.

Example 4

Two moles of the sodium salt of diethyl phosphonate, $(C_2H_5O)_2P(O)H$, were formed by reacting the phosphonate with two moles of metallic sodium, the reaction being carried out in dry xylene and the initial reaction temperature being held at $-25°$ C. until part of the reaction had occurred and then the reaction allowed to be completed by raising the temperature to approximately 40° C. The temperature was then raised to reflux and with continuous stirring allowed to heat further for a period of 2 hours. The desired product, the sodium salt of diethyl phosphonate, $(C_2H_5O)_2P(O)Na$, was obtained in solution and kept in this medium. To the 320 grams of this salt was added 1 mole or 143 grams of chloromethyldimethylchlorosilane. The mixture was allowed to reflux for a period of 4 hours after which time a purple sodium chloride salt had completely precipitated from solution. The reaction was stopped and the sodium chloride separated from the liquid product by filtering thru a Büchner funnel. The salt was dried and weighed and a total of 115 grams of NaCl was obtained. This indicates that a complete reaction giving the desired product was accomplished. The xylene was distilled from the liquid product and the resultant product in a 346 gram yield was obtained as a light, yellow liquid oil having the formula:

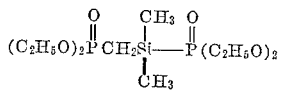

Infra-red analytical and molar refractive data substantiate the structure of this compound.

Example 5

The metal salt of diethyl phosphonate was prepared in a manner analogous to that described in Example 4. The diethyl phosphonate was mixed with an equal volume of toluene and the mixture cooled down to approximately —40° C. at which point two moles of metallic sodium (46 grams) were added to two moles or 276 grams of the diethyl phosphonate. A vigorous exothermic reaction was observed to occur. The cooling was continued until the vigorous reaction subsided and then the system was allowed to come up to room temperature after which time a clear homogeneous solution was observed. To these 320 grams of the sodium salt of diethyl phosphnate was added two moles of bis(chloromethyl)tetramethyldisiloxane. The mixture was allowed to reflux for a period of 6 hours after which time a purple color was readily observed. The desired product $[(C_2H_5O)_2P(O)CH_2Si(CH_3)_2]O_2$ was obtained. Infra-red analytical and molar refractive data substantiate the above structure. The product was obtained in about 90% yield.

Example 6

The sodium salt of dimethyl phosphonate was prepared in the manenr analogous to the procedures described in the above examples. To this sodium salt, one mole of chloromethyldimethylchlorosilane was added and the mixture allowed to reflux at atmospheric pressure for a period of 4 hours in toluene. After this time, chloride was observed to have formed and precipitated from solution. The product

was obtained. The yield of product obtained was 40%. Infra-red and analytical data confirmed the structure of this product.

Example 7

One mole of

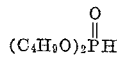

is reacted with 1 mole of chloromethylmethyldiethoxysilane $(ClCH_2Si(CH_3)(OC_2H_5)_2)$ in the presence of 1 mole of $(C_2H_5)_3N$ in a three-necked flask fitted with condenser and dropping funnel. The reaction is carried out at reflux temperature ($>120°$ C.) for 4 hours. Some $(C_2H_5)_3N \cdot HCl$ is observed to form. The mixture is placed in an autoclave and heated to 250° C. for 1 hour giving a precipitate of $(C_2H_5)_3N \cdot HCl$. The material is separated from amine hydrochloride to give about 20% yield of the compound having the formula

Example 8

One mole of

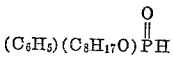

and 1 mole of $ClCH_2CH_2Si(CH_3)(OC_2H_5)_2$ is placed in an autoclave with one mole of $(C_2H_5)_3N$ and heated at 250° C. for 1 hour. $(C_2H_5)_3N \cdot HCl$ precipitated out and the product having the formula $(C_6H_5)(C_8H_{17}O)P(O)CH_2CH_2Si(OC_2H_5)_2CH_3$ in a 20–25% yield was obtained.

In a manner similar to the procedures outlined in Examples 6 and 7, diphenylphosphine oxide,

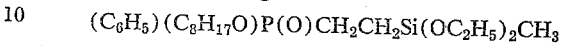

is reacted with chlorophenyl(methyl)diethoxysilane to form (diphenylphosphinylphenyl)methyldiethoxysilane,

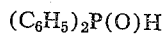

stearyl phenylphosphinite, $(C_{18}H_{37}O)(C_6H_5)PH$ is reacted with chlorocyclohexyldimethylpropoxysilane to form [stearoxy(phenyl)phosphinocyclohexyl]-dimethylpropoxysilane,

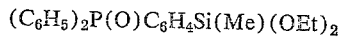

and diphenylphosphonite, $(C_6H_5O)_2PH$, is reacted with omegachlorohexylphenyldiethoxysilane to form (diphenoxyphosphinohexyl) phenyldiethoxysilane,

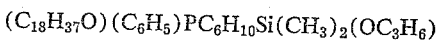

Example 9

A 300 ml. autoclave was charged with gamma-(phenylethylphosphino)propyltriethoxysilane (25.6 g., 0.075 mole) and benzene (40 ml.); then capped and tested for leaks at 400 p.s.i. No leaks were observed. The autoclave was pressurized to 275 p.s.i. with oxygen. It was placed in a rocker and shaken 15 minutes at room temperature. It was repressurized with oxygen to 275 p.s.i. (5 p.s.i. drop through solubility of $O_2$). Rocking was continued at 25° C. for 14 hours. A pressure drop of 20 p.s.i. was observed. Heat was applied slowly to the autoclave up to 60° C. over over 4 hours. The vessel was allowed to rock an additional three hours thereafter. The pressure at 25° C. on the gauge was 225 p.s.i. The calculated theoretical drop was 50 p.s.i.

The vessel was vented slowly and the product residue transferred to a 100 ml. round-bottomed flask and distilled in vacuo through a 15 inch insulated Vigreaux column. A fraction weighing 15.0 grams and having a refractive index, $N_D^{25}$, 1.4848 was obtained. Elemental analysis and infra-red analysis established this fraction as gamma - (phenylethylphosphinyl) - propyltriethoxysilane, $C_6H_5(C_2H_5)P(O)(CH_2)_3Si(OC_2H_5)_3$.

What is claimed is:

1. The process of making organosilicon compounds containing phosphorus interconnected to silicon through a divalent hydrocarbon group, which process comprises reacting a silicon compound selected from the class consisting of organosilanes containing at least one halohydrocarbyl group attached to silicon and at least one member of the class consisting of chlorine and alkoxy groups attached to silicon, each remaining valence of silicon being satisfied by a member of the class consisting of alkoxy and hydrocarbyl groups and organopolysiloxanes containing at least one halohydrocarbyl group attached to silicon, each remaining valence of silicon other than the valences making up the siloxane chain being satisfied by a member of the class consisting of hydroxy, alkoxy and hydrocarbyl groups, with a phosphorus compound selected from the class consisting of (a) compounds of trivalent phosphorus containing at least one member of the class consisting of hydrogen and alkali metal bonded to phosphorus the remaining valences of said trivalent phosphorus being satisfied by no other groups then hydrogen, hydrocarbyl and hydrocarbyloxy groups, and (b) compounds of quinquevalent phosphorus containing at least one hydrogen bonded to phosphorus, the remaining valences of phosphorus being satisfied by no other groups than one oxo group, hydrogen, hydrocarbyl groups and hydrocarbyloxy groups.

2. The process of making organosilanes containing phosphorus interconnected to silicon through a divalent hydrocarbon group, which process comprises reacting an organosilane containing at least one halohydrocarbyl group attached to silicon, and at least one member of the class consisting of alkoxy groups and chlorine attached to silicon, each remaining valence of silicon being satisfied by a member of the class of alkoxy and hydrocarbyl groups with a trivalent phosphorus compound containing one trivalent phosphorus atom and at least one member of the class consisting of hydrogen and alkali metal bonded to phosphorus, each remaining valence of phosphorus being satisfied by a member from the class consisting of hydrogen, hydrocarbyl and hydrocarbyloxy groups.

3. The process of making organosilanes containing phosphorus interconnected to silicon through a divalent hydrocarbon group, which process comprises reacting an organosilane containing at least one halohydrocarbyl group attached to silicon and at least one member of the class consisting of alkoxy groups and chlorine attached to silicon, each remaining valence of silicon being satisfied by a member of the class of alkoxy and hydrocarbyl groups with a pentavalent phosphorus compound containing one quinquevalent phosphorus atom, one oxo oxygen attached to phosphorus and at least one hydrogen bonded to phosphorus each remaining valence of phosphorus being satisfied by a member from the class consisting of hydrogen, hydrocarbyl and hydrocarbyloxy groups.

4. The process of making organopolysiloxanes consisting phosphorus interconnected to silicon through a divalent hydrocarbon group, which process comprises reacting an organopolysiloxane containing at least one halohydrocarbyl group attached to silicon each remaining unfilled valence of silicon other than the valences making up the siloxane chain being satisfied by a member from the class of hydroxy, alkoxy and hydrocarbyl groups with a trivalent phosphorus compound containing one trivalent phosphorus atom and at least one member of the class consisting of hydrogen and alkali metal bonded to phosphorus each remaining valence of phosphorus being satisfied by a member from the class consisting of hydrogen, hydrocarbyl and hydrocarbyloxy groups.

5. The process of making organopolysiloxanes containing phosphorus interconnected to silicon through a divalent hydrocarbon group, which process comprises reacting an organopolysiloxane containing at least one halohydrocarbyl group attached to silicon each remaining unfilled valence of silicon other than the valences making up the siloxane chain being satisfied by a member from the class consisting of hydroxy, alkoxy and hydrocarbyl groups with a pentavalent phosphorus compound containing one quinquevalent phosphorus atom, one oxo oxygen attached to phosphorus and at least one hydrogen bonded to phosphorus, each remaining valence of phosphorus being satisfied by a member from the class consisting of hydrogen, hydrocarbyl and hydrocarbyloxy groups.

6. The process of making gamma-(phenylethylphosphino) propyltriethoxysilane which comprises reacting gamma-chloropropyltriethoxysolane with sodium phenylethylphosphinide.

7. A process for the production of (dibutoxyphosphinylmethyl)methyldiethoxysilane which process comprises reacting dibutyl phosphonate with chloromethylmethyldiethoxysilane in the presence of triethylamine.

References Cited in the file of this patent

UNITED STATES PATENTS

| | | |
|---|---|---|
| 2,768,193 | Gilbert | Oct. 23, 1956 |
| 2,843,615 | Linville | July 15, 1958 |
| 2,889,349 | Garden et al. | June 2, 1959 |

FOREIGN PATENTS

| | | |
|---|---|---|
| 1,161,282 | France | Mar. 17, 1958 |

OTHER REFERENCES

Arbuzov et al.: Doklady Akad. Nauk. (USSR), vol. 59, No. 8, pp. 1433–35 (1948), translation available in Organosilicon Literature, vol. 5, pp. 116–20.

Keeber et al.: Jour. Organic Chem., vol. 21, No. 5, May 1956, pp. 509–13.

UNITED STATES PATENT OFFICE
CERTIFICATION OF CORRECTION

Patent No. 3,019,248            January 30, 1962

Frank Fekete

It is hereby certified that error appears in the above numbered patent requiring correction and that the said Letters Patent should read as corrected below.

Column 1, line 52, for "either" read -- ether --; column 3, line 45, in the compound, for "$(CH_3)(C_6H_6)PH$" read -- $(CH_3)(C_6H_5)PH$ --; column 4, line 44, for the left-hand radical of the formula reading "$C_6H$" read -- $C_6H_5$ --; column 5, lines 43 to 45, the formula should appear as shown below instead of as in the patent:

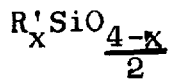

$$R'_x SiO_{\frac{4-x}{2}}$$

column 10, line 43, strike out "over", second occurrence; column 11, lines 37 and 38, for "consisting" read -- containing --; column 12, line 23, for "gamma-chloropropyltriethoxysolane" read -- gamma-chloropropyltriethoxysilane --.

Signed and sealed this 16th day of October 1962.

(SEAL)
Attest:

ERNEST W. SWIDER
Attesting Officer

DAVID L. LADD
Commissioner of Patents